United States Patent
Takezawa et al.

(10) Patent No.: US 10,598,294 B2
(45) Date of Patent: Mar. 24, 2020

(54) SAFETY JOINT FOR A FLUID FILLING APPARATUS

(71) Applicant: TATSUNO CORPORATION, Tokyo (JP)

(72) Inventors: Masahiro Takezawa, Tokyo (JP); Yuki Terasoma, Tokyo (JP); Kiyoshi Kimura, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 0 days.

(21) Appl. No.: 16/031,901

(22) Filed: Jul. 10, 2018

(65) Prior Publication Data
US 2019/0017616 A1    Jan. 17, 2019

(30) Foreign Application Priority Data
Jul. 11, 2017    (JP) .................................. 2017-135273

(51) Int. Cl.
*F16L 57/00*    (2006.01)
*F16L 29/02*    (2006.01)
(Continued)

(52) U.S. Cl.
CPC .............. *F16K 17/20* (2013.01); *F16L 29/02* (2013.01); *F16L 55/1007* (2013.01);
(Continued)

(58) Field of Classification Search
CPC . F16L 29/02; F16L 29/04; F16L 27/06; F16L 37/23; F16L 37/35; F16L 55/1015; F16L 57/00; F16L 57/005
(Continued)

(56) References Cited

U.S. PATENT DOCUMENTS

| 4,617,975 A | 10/1986 | Rabushka et al. |
| 2004/0065859 A1* | 4/2004 | Schulze .................. F16L 37/60 |
| | | 251/149.6 |

(Continued)

FOREIGN PATENT DOCUMENTS

| EP | 0034486 A | 8/1981 |
| JP | 09188397 A | 7/1997 |
| JP | 2007120717 A | 5/2007 |

OTHER PUBLICATIONS

European Search Report for EP 18 18 1171; dated Nov. 5, 2018.

*Primary Examiner* — Kevin L Lee
(74) *Attorney, Agent, or Firm* — Stetina Brunda Garred and Brucker; Mark B. Garred (57) ABSTRACT

To provide a safety joint capable of preventing a component of a weighing machine side member or a vehicle side member is broken in case that the weighing machine side member and the vehicle side member are separated from each other in an emergency when a vehicle runs while hydrogen gas is filled for instance. The safety joint (100) according to the present invention includes a plug (10) with a cylindrical shape in which a passage (1A) is formed, a socket (20) in which a passage (21A) continuing to the passage (1A) in the plug (10) is formed, and a shut off valve mounted on the passage (21A) in the socket (20), the shut off valve opening when the plug (10) being inserted into the socket (20) and closing when the plug (10) being disconnected therefrom, wherein central axes of the passages (1A,21A) of the plug (10) and the socket (20) do not form a straight line, a cover (50) for protecting a valve rod (2) mounted on one of the plug (10) and the socket (20) is mounted.

8 Claims, 9 Drawing Sheets

(51) Int. Cl.
*F16K 17/20* (2006.01)
*F16L 55/10* (2006.01)
(52) U.S. Cl.
CPC .......... *F16L 55/1015* (2013.01); *F16L 57/00* (2013.01); *F16L 57/005* (2013.01)
(58) Field of Classification Search
USPC .......... 137/614.03, 614.04; 251/149.1, 149.6
See application file for complete search history.

(56) References Cited

U.S. PATENT DOCUMENTS

2010/0319690 A1* 12/2010 Cuzydlo ............. A61M 16/183
128/203.12
2013/0125989 A1   5/2013 Clever et al.

* cited by examiner

SAFETY JOINT FOR A FLUID FILLING APPARATUS

CROSS-REFERENCE TO RELATED APPLICATIONS

The present application claims priority to Japanese Patent Application No. 2017-135273 filed on Jul. 11, 2017, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a safety joint for a filling apparatus for filling gas such as hydrogen gas used as fuel, more particularly to a safety joint for separating the filling apparatus and a filling hose from each other in an emergency.

2. Description of the Related Art

Figure 12:
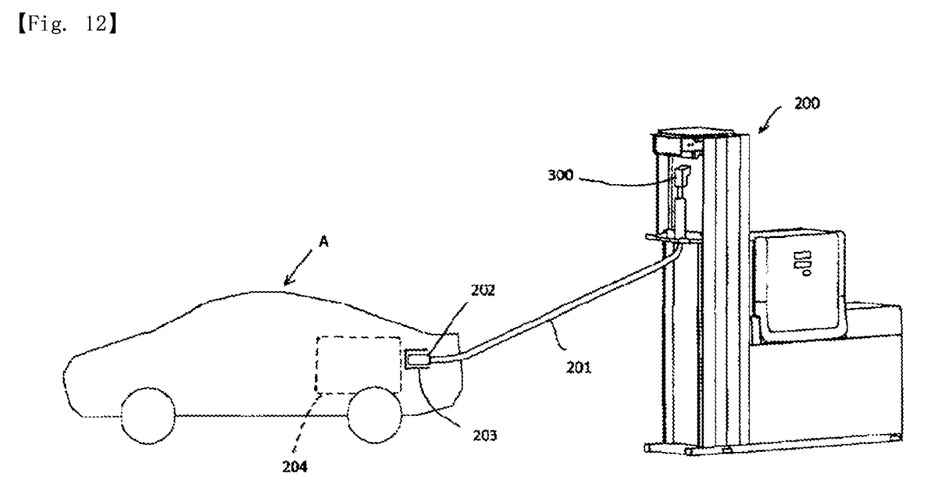
FIG. 12 is a brock diagram showing an outline of a hydrogen filling station.

For example, to a vehicle A using hydrogen as fuel, as show in FIG. 12, at a hydrogen filling station is filled hydrogen gas after a filling nozzle 202 mounted on an end of a filling hose 201 and a vehicle side filling port 203 are connected with each other. The filling is controlled depending on the maximum using pressure of a hydrogen tank 204 mounted in the vehicle A. Here, when the vehicle A runs to pull the filling hose 201 while hydrogen gas is filled, a hydrogen filling apparatus is pulled down and broken to inject a hydrogen gas, or, devices such as the filling nozzle 202 and the filling hose 201 are broken to inject a hydrogen gas, so that it becomes a dangerous condition. In order to prevent the condition, a safety joint 300 for emergency releasing is mounted on an area between the hydrogen filling apparatus 200 and the filling hose 201, the safety joint 300 is separated when a tensile force more or equal to a predetermined value is applied to the filling hose 201, and it is prevented that the hydrogen filling apparatus 200 and devices such as the filling nozzle 202 and the filling hose 201 are broken.

As the safety joint for emergency releasing is proposed a safety joint in which a passage in a member on a weighing machine (the hydrogen filling apparatus 200) side (the passage communicating with a weighing machine side hose) and a passage in a member on a vehicle side (the passage communicating with the hose having the filling nozzle) are orthogonal with each other (refer to Japanese Patent Publication No. 2007-120717 gazette for example). However, the safety joint for emergency releasing has a long rod as a member on the weighing machine side or on the vehicle side, and the rod is exposed when the weighing machine side member and the vehicle side member are separated from each other. Then, when the member having the long rod falls or collides with the weighing machine or the vehicle, there is a possibility that the exposed rod is broken. A technique for solving the problem has not been proposed yet.

The contents of Japanese Patent Publication No. 2007-120717 is incorporated herein by reference in their entirety.

BRIEF SUMMARY

The present invention has been made in consideration of the above problems in the prior art, and the object thereof is to provide a safety joint capable of preventing a component of the weighing machine (hydrogen filling apparatus) side member or the vehicle side member is broken in case that the weighing machine side member and the vehicle side member are separated from each other in an emergency when the vehicle runs while hydrogen gas is filled for instance.

A safety joint (100: pipe joint for emergency releasing) according to the present invention is characterized by including a plug (10) with a cylindrical shape in which a passage (1A: in-plug passage) is formed, a socket (20) in which a passage (21A: in-socket passage) continuing to the passage (1A) in the plug (10) is formed, and a shut off valve mounted on the passage (21A) in the socket (20), the shut off valve opening when the plug (10) being inserted into the socket (20) and closing when the plug (10) being disconnected therefrom, wherein central axes of the passages (1A, 21A) of the plug (10) and the socket (20) do not form a straight line (but those are orthogonal with each other for instance), and a cover (50) for protecting a valve rod (2: plug side rod) mounted on one of the plug (10) and the socket (20) is mounted.

Here, it is preferable that the longitudinal size of the cover (50) is longer than that of the valve rod (2), and the cover (50) is configured to thoroughly surround the valve rod (2). In addition, it is preferable that the safety joint (100) according to the present invention is arranged near a weighing machine (hydrogen filling apparatus) and near a base portion of the filling hose communicating with the filling nozzle.

In the present invention, it is preferable that the cover (50) surrounds a portion of the member on which the valve rod (2) is not mounted and has a shape capable of being attached to the plug (10) and the socket (20). Here, "capable of being attached" defines that, in an emergency such that a vehicle suddenly moves when hydrogen is filled, the cover (50) does not prevent the separation between a weighing machine (hydrogen filling apparatus) side member and a vehicle side member, but the cover (50) is not separated from the weighing machine side member or the vehicle side member after they are separated from each other.

In addition, in the present invention, it is preferable that one of the plug (10) and the socket (20) includes depressurizers (30, 30A) including a main body portion (31) made of metal, a depressurizing communication hole (31B) communicating with a hydrogen gas passage (31A) in the main body portion (31), a depressurizing plug (32) made of metal, the depressurizing plug (32) insertable into the depressurizing communication hole (31B), and tapered portions (pin tapered portion 32B of the depressurizing plug 32, tapered portion 31BB of the depressurizing communication hole 31B) formed on the depressurizing communication hole (31B) and the depressurizing plug (32) respectively, the tapered portions (32B, 31BB) having complemental shapes with each other. In this case, it is preferable that the safety joint (100) further includes a relief circuit (31C) for outflowing a filled fluid (hydrogen gas for instance) and communicating with the depressurizing communication hole (31B), an outlet of the relief circuit (31C) being formed at a position separated from an area above the depressurizing plug (32).

In the depressurizer (30), it is preferable that a length (L) of a hydrogen passage side end portion (32A: pin end portion) of the depressurizing plug (32) and a length (HL) of a hydrogen passage side end portion (31BA: small diameter portion) of the depressurizing communication hole (31B) are long. However, when the length (L) of the hydrogen passage side end portion (32A: pin end portion) is short, in the depressurizer (30A) can be mounted a locking pin insertion hole (31D) (the depressurizer 30A can be configured such that a locking pin P for suppressing rotation of a hexagonal rod spanner S can be inserted therein).

With the present invention with the above construction, one of the plug (10) and the socket (20) has the cover (50) for surrounding (protecting) the valve rod (2: plug side rod), so that impacts are not directly added to the valve rod (2) even if a member on which the valve rod (2) is mounted (one of the plug 10 and the socket 20) is separated from the member on which the valve rod (2) is not mounted (another one of the plug 10 and the socket 20) to fall or collide with the weighing machine or the vehicle in an emergency such that a vehicle suddenly moves when hydrogen is filled.

Here, when the safety joint (100) according to the prevent invention is attached to the filling hose on the filling nozzle side, weight of the hose becomes heavy by the safety joint (100), so that there is a possibility that workers feel inconvenience to handle the hose. On the contrary, when the safety joint (100) is disposed near the weighing machine and near the base portion of the filling hose communicating with the filling nozzle, the safety joint (100) is supported by the weighing machine, so that the weight of the hose does not become heavy and there is no possibility that workers feel inconvenience to handle the hose.

In the present invention, central axes of a passage (the in-plug passage 1A) in the plug (10) and another passage (the in-socket passage 21A) in the socket (20) do not form a straight line (orthogonal with each other for instance), so that central axes of a valve rod (rod 2) in the plug (10) and a valve rod (rod 22) in the socket (20) do not form a straight line also, the plug side rod 2 and the socket side rod 22 are not pressed with each other in a straight line under a condition that end portions (pin connecting end portions) contact with each other. Therefore, even if high pressure hydrogen gas is fed, forces generated at the press between the socket side rod 22 and the plug side rod 2 with each other do not increase and the socket (20) and the plug (10) do not separate from each other. Then, the end portions of the socket side rod (22) and the plug side rod (2) are not pressed with each other, and directions that the socket (20) and the plug (10) are separated from each other are different from each other, so that the separated socket (20) and plug (10) are not blown off. Further, the safety joint 100 can be made small in size and light in weight, and when high pressure hydrogen gas is filled for instance, operability of the filling hose improves.

In the present invention, with the depressurizers (30, 30A) mounted on one of the plug (10) and the socket (20), when the plug (10) and the socket (20) are separated from each other, high pressure hydrogen gas in the filling hose can be discharged at small flow rate outside the filling hose (outside the depressurizers 30, 30A). Therefore, it is prevented that the high pressure hydrogen gas rapidly injects, and the filling hose unexpectedly moves around due to the rapid injection of the hydrogen gas.

Here, in the depressurizers (30, 30A), in a metal main portion (31) may be formed a depressurizing communication hole (31B) communicating with a hydrogen gas passage (31A), a metal depressurizing plug (32) insertable into the depressurizing communication hole (31B) can be mounted, and to the depressurizing communication hole (31B) and the depressurizing plug (32) may be formed tapered portions (a pin tapered portion 32B of the depressurizing plug 32 and a tapered portion 31BB of the depressurizing communication hole 31B) having complemental shapes with each other. With this, a portion where the pin tapered portion (32B) of the depressurizing plug (32) and the tapered portion (31BB) of the depressurizing communication hole (31B) contact with each other configures metal seal to completely shut high pressure hydrogen gas flowing in the hydrogen gas passage (31A). Then, at the depressurizing, when the contact of the tapered portions (the pin tapered portion 32B and the tapered portion 31BB) is released, the gap (cross sectional area $(\pi/4)(d2-\varphi 2)$, annular gap) formed between an outer periphery of the hydrogen passage side end portion (32A: pin end portion, diameter size "$\varphi$") of the depressurizing plug 32 and an inner periphery of the hydrogen passage side end portion (31BA: small diameter portion, inner diameter "d") of the depressurizing communication hole 31B works as an orifice, and imparts pressure loss to high pressure hydrogen gas flowing through the orifice, so that injecting velocity of hydrogen gas outflowing from the depressurizers (30, 30A) becomes slow, which prevents the filling hose with the depressurizers (30, 30A) from unexpectedly moving around.

In addition, the relief circuit (31C) for outflowing hydrogen gas may be formed, and the outlet of the relief circuit (31C) can be disposed apart from an area above the depressurizing plug (32), even if sparks generate by contacts between metals when the hexagonal rod spanner (S: hexagonal wrench) is inserted into a hexagonal hole (32E: plug hexagonal hole) at an upper portion of the plug (32) to be rotated, a position where the hydrogen gas outflows from relief circuit (31C) is separated from a position where the sparks generate, so that the a possibility that the hydrogen gas catches fire due to the sparks becomes extremely low, and safety of the filling apparatus improves.

DETAILED DESCRIPTION

Figure 1:
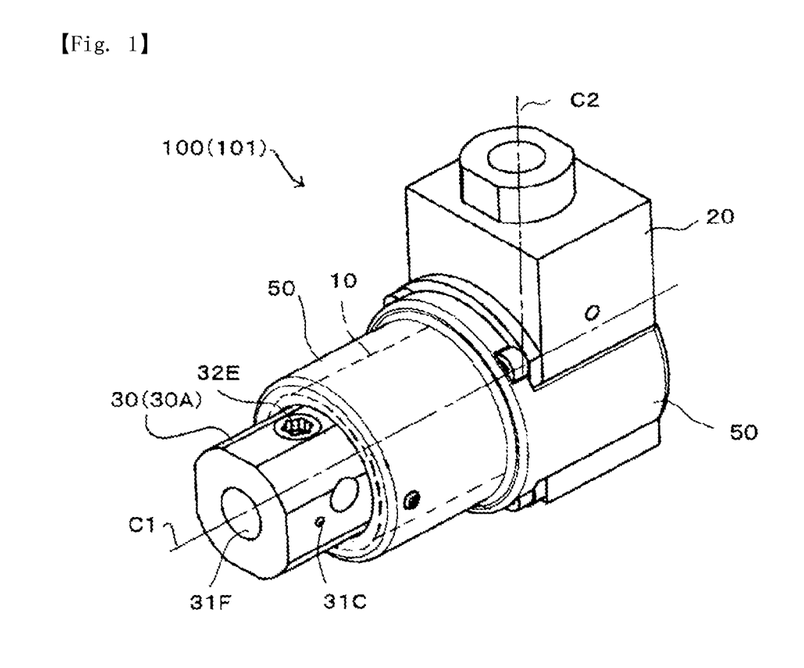
FIG. 1 is a perspective view showing an outline of a safety joint according to an embodiment of the present invention.
Figure 2:
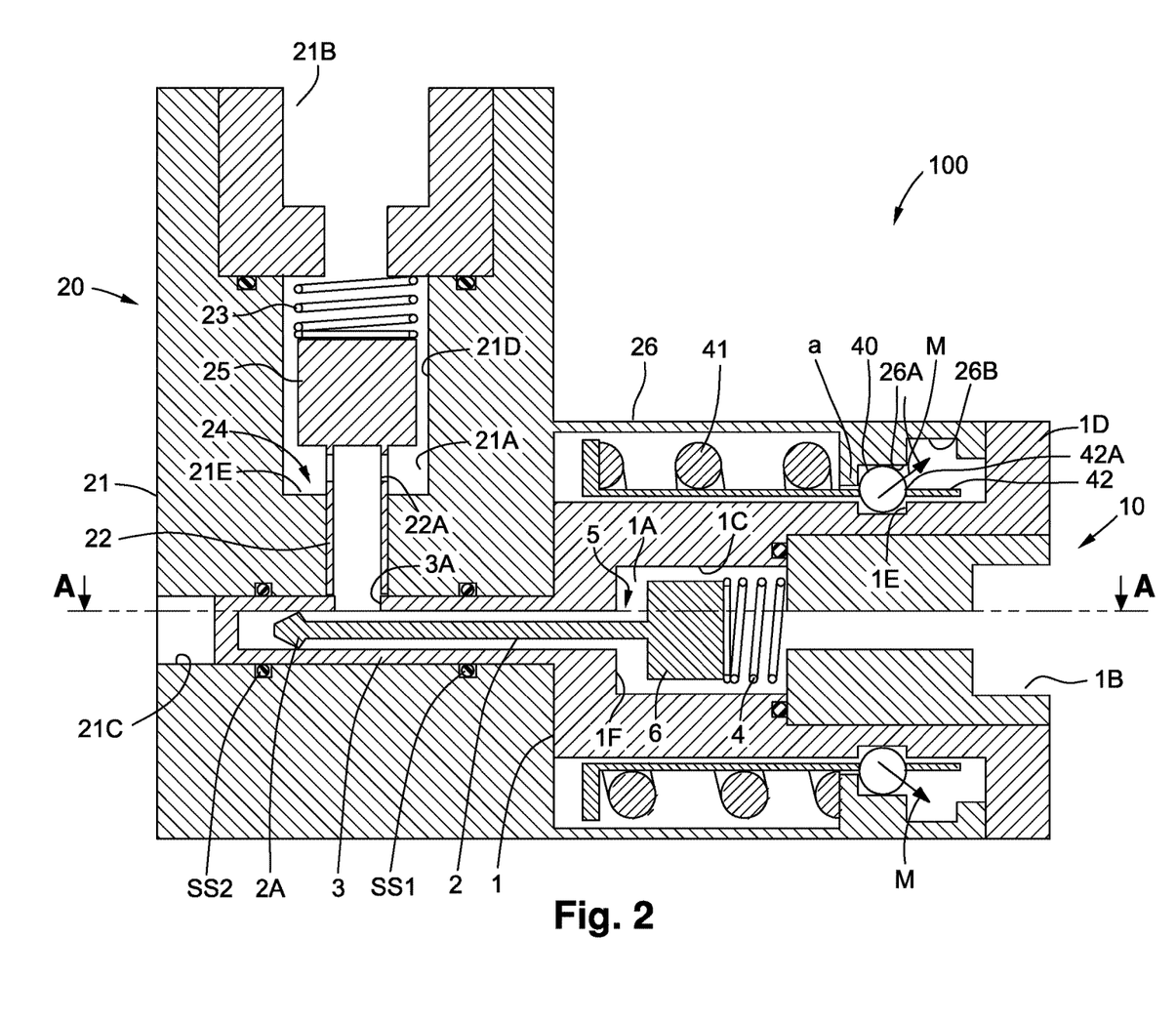
FIG. 2 is an explanatory cross sectional view showing a condition that a plug and a socket are connected with each other in the embodiment.

Hereinafter, an embodiment of the present invention will be explained with reference to the attached drawings. In FIG. 1, a whole safety joint according to the embodiment is shown as the numeral 100, and the safety joint 100 includes a plug 10 (covered with a cover described below) with a cylindrical shape and a socket 20. When the socket 20 is connected to the plug 10 (the plug 10 is inserted into the socket 20), opening a shutoff valve to communicate an in-socket passage 21A (refer to FIG. 2 etc.) with an in-plug passage 1A (FIG. 2). In FIG. 1, the plug 10 and the socket 20 are connected with each other. Here, the plug 10 is basically connected to a vehicle (not shown in in FIG. 1) side, and the socket 20 is basically connected to a hydrogen filling apparatus (or a dispenser, a weighing machine, not shown in FIG. 1) side. However, it is possible to arrange the plug 10 to the hydrogen filling apparatus side and arrange the socket 20 to the vehicle side.

Central axes of the in-plug passage 1A (FIG. 2) in the plug 10 and the in-socket passage 21A (FIG. 2) in the socket 20 are orthogonal with each other, and the central axes of the in-plug passage 1A and the in-socket passage 21A do not form a straight line. Constructions and action effects of the plug 10 and the socket 20 including the in-plug passage 1A, the in-socket passage 21A and the like (in a condition that the plug 10 and the socket 20 are connected with/separated from each other) will be explained in detail with reference to FIGS. 2 to 5, and to the central axes of the in-plug passage 1A and the in-socket passage 21A are attached C1 and C2 respectively in FIG. 1. In FIG. 1, on an area extending on the vehicle side (left side in FIG. 1) in the central axis C1 of the in-plug passage 1A is arranged a filling hose not shown, and a hydrogen gas introducing port side (upper side in FIG. 1) in the central axis C2 of the in-socket passage 21A is connected to a hydrogen filling apparatus not shown.

A cover 50 is mounted to protect a plug side rod 2 (FIGS. 2 to 5) mounted to the plug 10, the longitudinal size of the cover 50 is longer than that of the plug side rod 2, and thoroughly surrounds the plug side rod 2. In FIG. 1, the cover 50 surrounds an area from a portion near one end of the plug 10 to another portion near another end of the plug 10 in the central axis C1 direction of the in-plug passage 1A, and thoroughly surrounds the plug side rod 2 mounted in the plug 10. In addition, the cover 50 is attached to the plug 10, and surrounds a portion (lower portion in FIG. 1) of the socket 20. Here, the cover 50 is connected to the plug 10 such that the cover 50 does not prevent the separation between the plug 10 and the socket 20 but the cover 50 is connected to the plug 10 to a degree that the cover 50 does not separate from the plug 10 after the plug 10 and the socket 20 are separated from each other in an emergency such that a vehicle moves when hydrogen is filled. Meanwhile, the safety joint 100 is arranged near the hydrogen filling apparatus 200 (FIG. 12) and near the base portion of the filling hose 201.

In FIG. 1, on a vehicle side end portion (left end portion in FIG. 1) of the plug 10 surrounded by the cover 50 is mounted a depressurizer 30 (or 30A). The depressurizer 30 is not surrounded by the cover 50, and a plug hexagonal hole 32E into which a depressurizing plug formed on an outer side surface of the depressurizer 30 is exposed in FIG. 1. On a radially central portion of the depressurizer 30 is formed a hydrogen gas passage 31A (FIGS. 6 to 9), and the hydrogen gas passage 31A is connected to the in-plug passage 1A (FIGS. 2 to 5) of the plug 10. On the vehicle side (left side in FIG. 1) of the depressurizer 30 is arranged a filling hose not shown. The numeral 31F in FIG. 1 indicates a concave portion to which the filling hose on the vehicle side is connected, and the numeral 31C indicates (an outlet of an outer side surface of) a relief circuit in the depressurizer 30. In addition, the depressurizer 30 (or 30A) will be explained with reference to FIGS. 6 to 10.

Next, the plug 10 and the socket 20 of the safety joint 100 will be explained with reference to FIGS. 2 to 5. Here, the cover 50 explained with reference to FIG. 1 is shown by doted lines in FIGS. 3 and 5 to simplify illustrations, but is deleted in FIGS. 2 and 4 to avoid complexies in illustrations. In FIG. 2, the plug 10 shaped like a cylinder as a whole body includes a plug main body 1 and a plug side rod case 3. To a central portion (a vertically central portion in FIG. 2) of the vehicle side (right side in FIG. 2) end portion of the plug main body 1 is mounted a hydrogen gas supply port 1B. On the plug main body 1 is formed the in-plug passage 1A extending in a lateral direction of FIG. 2, and on the in-plug passage 1A is formed a plug side valve element accommodating portion 1C. The in-plug passage 1A communicates with a passage in the plug side rod case 3, and communicates through a passage in the plug side valve element accommodating portion 1C with the hydrogen gas supply port 1B.

In the in-plug passage 1A is accommodated the plug side rod 2, and on an end portion on the side (right side in FIG. 2) separated from the socket 20 of the plug side rod 2 is mounted a plug side valve element 6. On the vehicle side (right side in FIG. 2) of the plug side valve element 6 accommodated in the valve element accommodating portion 1C is arranged a plug side spring 4, which energizes the plug side valve element 6 toward the socket 20 side (left side in FIG. 2). Then, the plug side valve element 6 and a valve seat 1F configure a plug side shutoff valve 5, and the plug side shutoff valve 5 has a function of shutting/opening the plug side passage 1A. An end portion on the opposite side (left side in FIG. 2) of the valve element 6 configures a locking portion 2A.

In FIG. 2, on the outside in a radial direction of the hydrogen gas supply port 1B of the plug main body 1 is formed a flange portion 1D. The flange portion 1D is a connecting surface to the depressurizer 30 (or 30A: refer to FIGS. 1 and 6 to 10) not shown. Then, when the plug 10 and the socket 20 are connected with each other, the surface (left side surface of the flange portion 1D in FIG. 2) of the flange portion 1D on the opposite side to the surface connected to the depressurizer 30 (FIG. 1) abuts on a plug accommodating housing 26. On an outer peripheral surface of the plug main body 1 is formed a connecting channel 1E, and to the connecting channel 1E is fitted connecting balls 40 for connecting the plug 10 and the socket 20 with each other.

The plug side rod case 3 projects from the plug main body 1 toward the socket 20 side (left side in FIG. 2). On a socket 20 side end portion is shaped a opening portion 21C whose hollow cylindrical shape is closed, and in FIGS. 2 and 3 in an inner space of the opening portion 21C is accommodated the plug side rod 2. In the outer periphery of the plug side rod case 3, at a predetermined position (corresponding to a lower portion of a socket side rod 22) is formed an opening 3A for passage connection. In FIG. 2, the plug side rod case 3 is inserted into an opening portion 21C of the socket 20 (the socket main body 21), and the in-plug passage 1A and an in-socket passage 21A are communicated with each other through the opening 3A.

Figure 3:
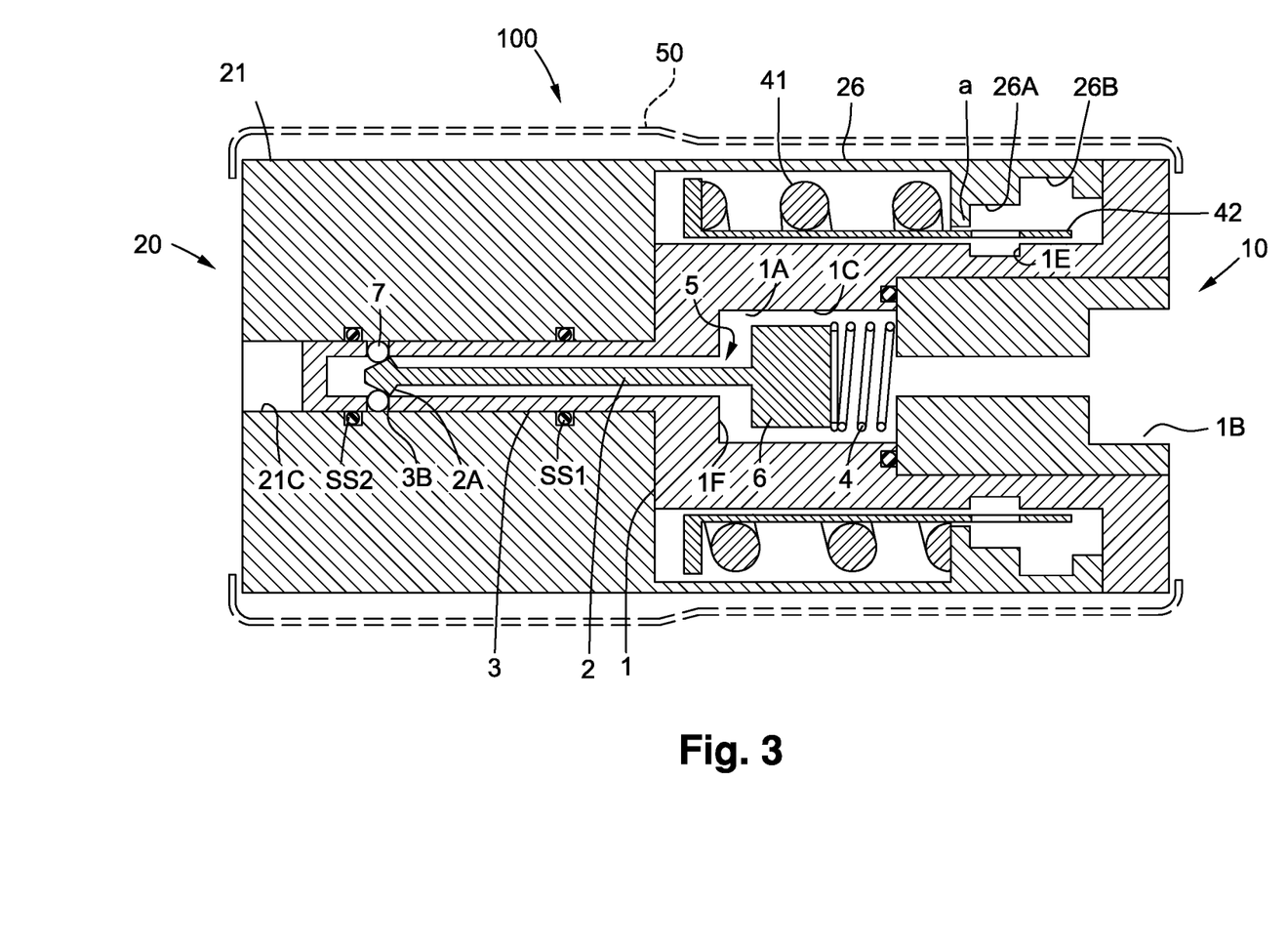
FIG. 3 is a cross sectional view taken along the A-A line in FIG. 2.
Figure 5:
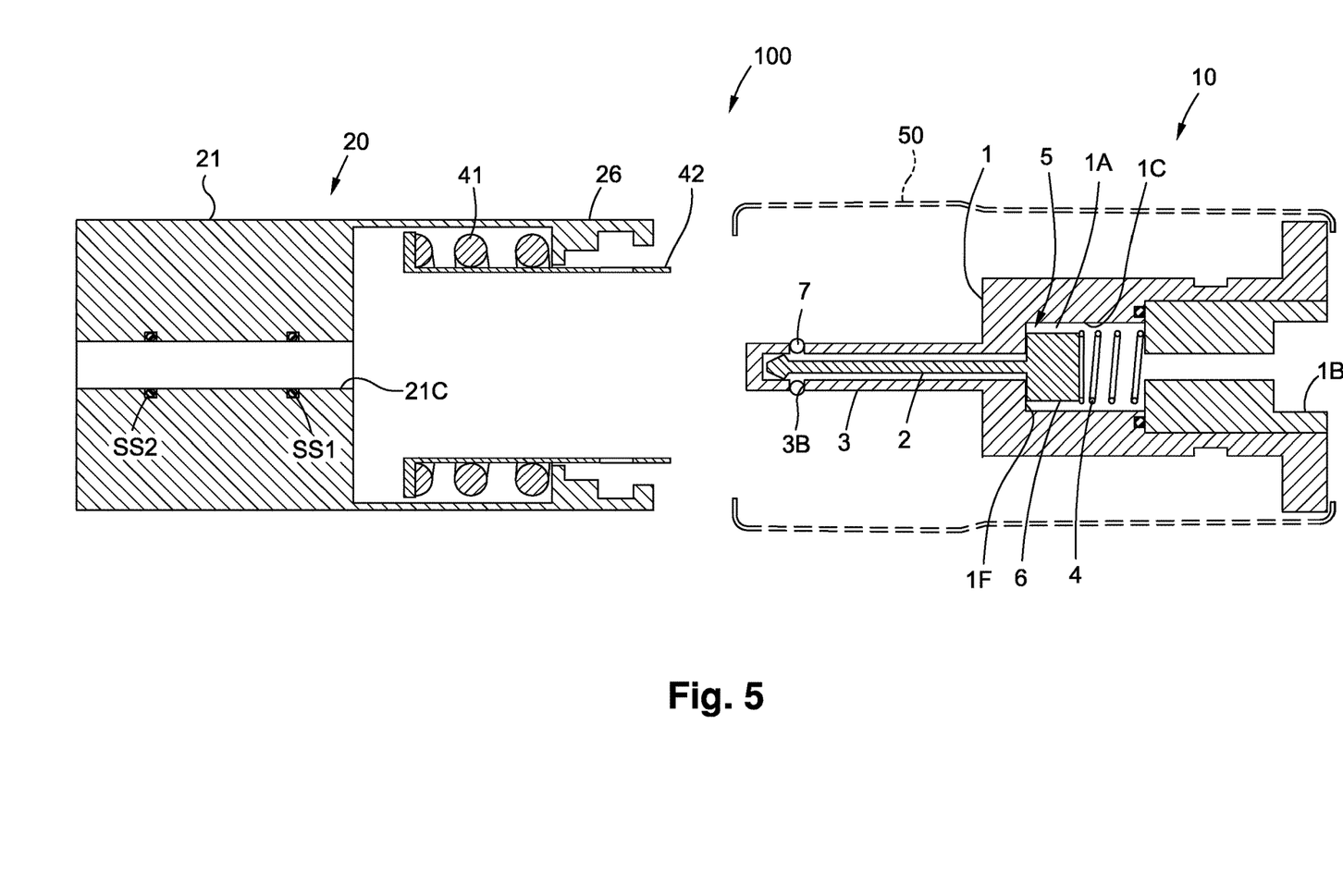
FIG. 5 is a cross sectional view taken along the B-B line in FIG. 4.

In FIG. 3, near the socket 20 side end portion of the plug side rod case 3 is formed a locking ball channel 3B, and in the locking ball channel 3B are held locking balls 7. As shown in FIG. 3, by a tapered portion of the locking portion 2A are pressed the locking balls 7 radially outward. But, under the condition shown in FIG. 3, by an inner wall surface of the opening portion 21C of the socket 20, the locking balls 7 do not move radially outward the plug side rod case 3. On the other hand, as shown in FIG. 5, under a condition that the plug 10 and the socket 20 are separated from each other, there is no member that prevents the locking balls 7 from moving radially outward, and the locking balls 7 position radially outward (the plug side rod case 3).

In FIG. 2, the socket 20 shaped like a cylinder as a whole body has the socket main body 21 and the plug accommodating housing 26. On a horizontally central portion of a hydrogen filling apparatus side (upper side in FIG. 2) end portion of the socket main body 21 is formed a hydrogen gas introducing port 21B. On a horizontally central portion of the socket main body 21 shown in FIG. 2 is formed the in-socket passage 21A extending in the vertical direction, and in a socket side valve element accommodating portion 21D (enlarged portion) formed on the in-socket passage 21A is accommodated a socket side valve element 25. The in-socket passage 21A communicates from the hydrogen gas introducing port 21B through the socket side valve element accommodating portion 21D and a hollow portion of the socket side rod 22, with the opening portion 21C of the socket main body 21. Here, an end portion on the side separated from the plug 10 of the opening portion 21C is opened. In FIGS. 2 and 3, into the opening portion 21C is inserted the plug side rod case 3, and the in-socket passage 21A communicates through the hollow portion of the socket side rod 22 and the opening 3A of the plug side rod case 3 with the in-plug passage 1A. On the inner periphery of the opening portion 21C of the socket main body 21 are mounted O-rings SS1, SS2.

To the socket side valve element 25 is connected the socket side rod 22. On the side of the hydrogen gas introducing port 21B (upper side in FIG. 2) of the socket side valve element 25 is arranged a socket side spring 23, and the socket side spring 23 energizes the socket side valve element 25 toward a valve seat 21E (lower side in FIG. 2). Then, the valve element 25 and the valve seat 21E configure a socket side shutoff valve 24, which has a function of shutting/opening the socket side passage 21A. A hydrogen gas fed to the valve element accommodating portion 21D inflows through the openings 22A formed on the socket side rod 22 to the hollow portion of the socket side rod 22. Here, the hollow portion of the socket side rod 22 configures a portion of the in-socket passage 21A.

The plug accommodating housing 26 whose end portion is opened projects from the socket main body 21 toward the plug 10 (right side in FIG. 2). On the inner peripheral surface of the plug accommodating housing 26 are formed at-connection arrangement portions 26A and an at-disconnection accommodating channel 26B. On the at-connection arrangement portions 26A are arranged the connecting balls 40 when the plug 10 and the socket 20 are connected with each other, and in the at-disconnection accommodating channel 26B are accommodated the connecting balls 40 moved from the at-connection arrangement portions 26A when from the socket 20 is disconnected the plug 10. The horizontal (lateral in FIG. 2) position of the at-connection arrangement portions 26A corresponds to that of the plug side connecting channel 1E of the plug main body 1. In addition, on the side of the socket 20 (left side in FIG. 2) of the at-connection arrangement portions 26A is formed a projection a projecting from the at-connection arrangement portions 26A inwardly in a radial direction of the plug 10.

When hydrogen gas is filled, the main body 1 of the plug 10 is inserted into the plug accommodating housing 26, and by the connecting balls 40 and the connecting spring 41 are integrally connected the plug 10 and the socket 20 with each other. As shown in FIG. 2, when the plug 10 and the socket 20 are connected with each other, the spring holder 42 to which the connecting spring 41 is attached positions in a gap between the inner peripheral surface of the plug accommodating housing 26 and the outer peripheral surface of the plug main body 1. The connecting balls 40 are fitted into connecting ball holes 42A formed on the spring holder 42, and engage with the plug side connecting channel 1E of the plug main body 1. At this time, on the socket 20 side of the connecting balls 40 (left side in FIG. 1) positions the projection a, and in the radially outward direction of the connecting balls 40 position the at-connection arrangement portions 26A. The spring holder 42 engages with the plug 10 through the connecting balls 40 and the plug side connecting channel 1E into which the connecting balls 40 are fitted. Therefore, when the plug 10 and the socket 20 are connected with each other, the plug 10 and the socket 20 are integrated with each other so as to hold the spring holder 42 and the connecting balls 40 in between.

In FIG. 2, when a force pulling out the plug 10 (a tensile force for separating from the socket 20: a force moving the plug 10 rightward in FIG. 2) is applied, through the connecting balls 40, the spring holder 42 and the connecting spring 41 try to move in a direction apart from the socket 20 (right side in FIG. 2). Unless more or equal to predetermined magnitude of force for pulling out the plug 10 is applied thereto, even if to the connecting balls 40 are applied the forces shown as the allows M in FIG. 2, the forces are weakened by the elastically repulsive force by the connecting spring 41, and a condition that connecting balls 40 are fitted into the plug side connecting channel 1E is maintained, which does not release the connection between the plug 10 and the socket 20. On the other hand, when more or equal to predetermined magnitude of force for pulling out the plug 10 is applied thereto, the connecting balls 40 disengaged from the plug side connecting channel 1E and move in the arrow M directions, and as show in FIG. 4, the connecting balls 40 are fitted into the at-disconnection accommodating channel 26B (FIG. 2) of the plug accommodating housing 26. Then, the plug 10 is disconnected from the socket 20, resulting in a disjoint condition shown in FIGS. 4 and 5. Here, the predetermined value (boundary value that the joint between the plug 10 and the socket 20 is released) is determined based on specifications of the hydrogen filling apparatus, the filling hose and the like, and based on the predetermined value are designed the plug 10 and the plug accommodating housing 26, the connecting balls 40, the connecting spring 41 and the spring holder 42 of the socket 20.

As shown in FIG. 2, under a condition the plug 10 and the socket 20 are connected with each other, the lower end portion (FIG. 2) of the hollow socket side rod 22 abuts on the plug side rod case 3, so that the socket side rod 22 positions, against the elastically repulsive force of the socket side spring 23, on an upper portion from the valve seat 21E in FIG. 2, and the socket side shutoff valve 24 opens. In addition, as shown in FIG. 3, the plug side rod 2 that cannot move leftward from the locking balls 7 separates, against the elastically repulsive force of the plug side spring 4, the plug side valve element 6 from the plug side valve seat 1F. As a result, the plug side shutoff valve 5 opens. When both of the socket side shutoff valve 24 in the socket 20 and the plug side shutoff valve 5 in the plug 10 become open, the in-socket passage 21A (the hydrogen gas introducing port 21B, the socket side valve element accommodating portion 21D, the hollow portion of the socket side rod 22 and the opening portion 21C of the socket 20) and the in-plug passage 1A (the hollow portion of the plug side rod case 3, the plug side valve element accommodating portion 1C) are communicated with each other, and from the side of the hydrogen filling apparatus (weighing machine) to the side of the vehicle flows hydrogen gas.

Figure 4:
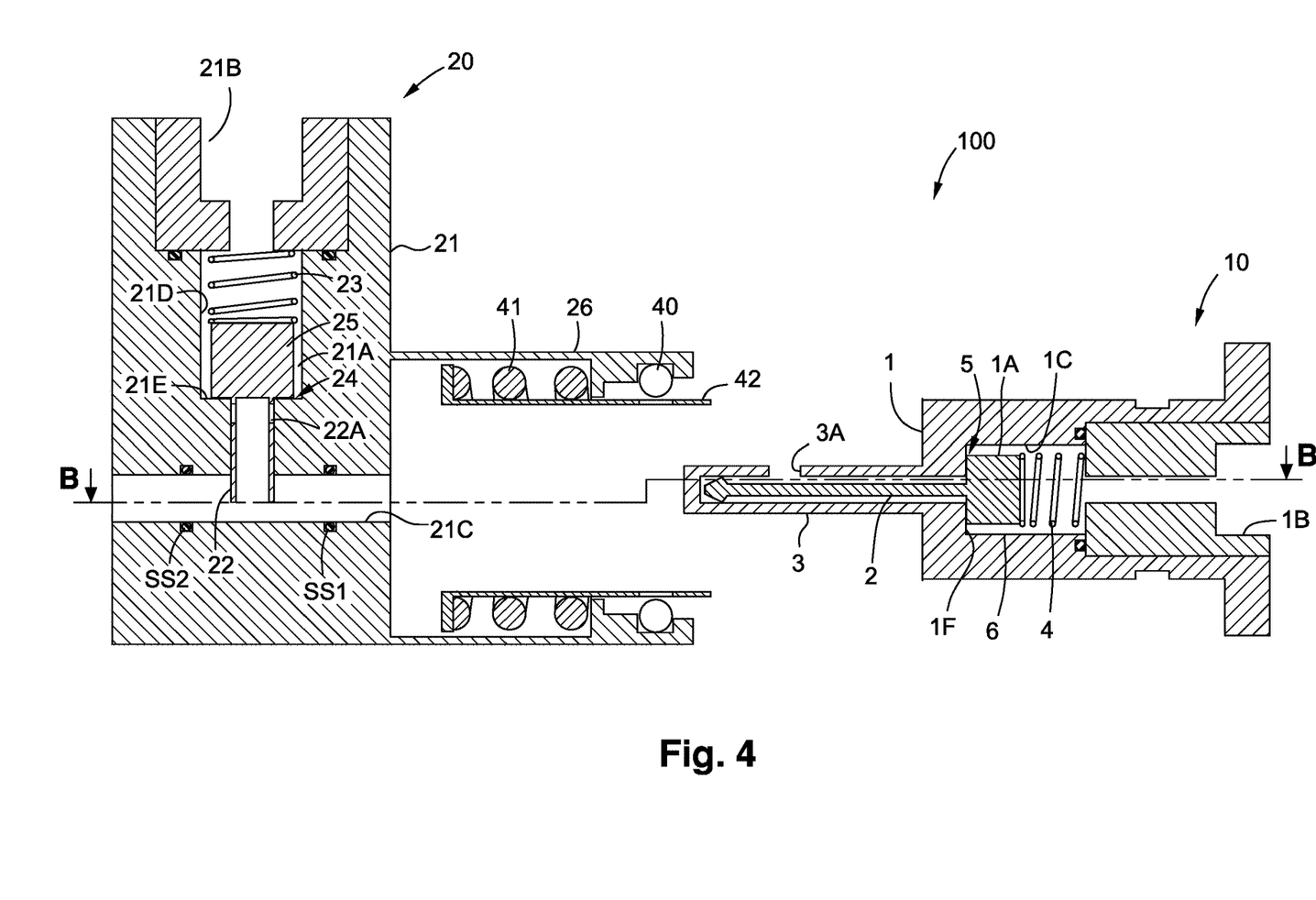
FIG. 4 is an explanatory cross sectional view showing a condition that the plug and the socket are separated from each other in the embodiment.

At an emergency such as vehicle starts while hydrogen gas filling, a tensile force more or equal to a predetermined magnitude is applied to the filling hose so as to detach the connecting balls 40 from the plug side connecting channel 1E, the plug 10 and the socket 20 are disconnected from each other. When the plug 10 and the socket 20 are disconnected from each other, as shown in FIG. 4, the plug side rod case 3 of the plug 10 is detached from the opening portion 21C of the socket 20 (socket main body 21), and the socket side valve element 25 moves downward in FIG. 4 by an elastically repulsive force of the socket side spring 23. As a result, the socket side valve element 25 seats on the socket side valve seat 21E, and the socket side shutoff valve 24 shuts the in-socket passage 21A. In addition, as shown in FIG. 5, when the locking balls 7 move outward the plug side rod case 3 in a radial direction from the locking ball channel 3B, the locking portion 2A (FIG. 2) of the plug side rod 2 moves leftward from the locking balls 7 by the elastically repulsive force of the plug side spring 4. As a result, the plug side valve element 6 seats on the plug side valve seat 1F, and the plug side shutoff valve 5 shuts the in-plug passage 1A. Since the socket side shutoff valve 24 and the plug side shutoff valve 5 close the in-socket passage 21A and the in-plug passage 1A respectively, hydrogen gas does not leak from vehicle side and hydrogen filling apparatus side.

As explained with reference to FIG. 1, the cover 50 is mounted to protect the plug side rod 2, the cover 50 covering the plug 10 and a portion of the socket 20. The cover 50 is expressed with dashed lines in FIGS. 3 and 5. As shown in FIG. 5, when the plug 10 and the socket 20 are disconnected from each other, the cover 50 attached to the plug 10 side separates from the socket 20. A length of the cover 50 is long in a longitudinal direction of the plug side rod 2, and the cover 50 is configured such that perfectly covering the plug side rod 2. Therefore, even if the plug 10 and the socket 20 are separated from each other, and the plug 10 falls or collides with the hydrogen filling apparatus or the like, the plug side rod 2 is protected by the cover 50.

In the socket 20 (socket main body 21) of the safety joint 100 shown in FIGS. 2 to 5, the end portion opposite to the plug 10 side (left side in FIG. 2) of the opening portion 21C in which the plug side rod case 3 is inserted opens to be a through hole. But, in the opening portion 21C, the end portion opposite to the plug 10 side (left side in FIG. 2) can be closed to be a blind hole. In this case, the O-ring SS2 is not required.

Next, the depressurizer 30 (or 30A) will be explained with reference to FIGS. 6 to 10. The depressurizer 30 is, as shown in FIG. 1 for example, attached to the plug 10 of the safety joint 100, and has a function of depressurizing high pressure hydrogen gas in an area on the vehicle side from the plug 10 (in-plug passage 1A, FIGS. 2 to 5) when the plug 10 and the socket 20 are separated from each other. In addition, high pressure hydrogen gas in an area on the hydrogen filling apparatus side from the socket 20 is depressurized by a depressurizing mechanism not shown on the hydrogen filling apparatus side.

Figure 6:
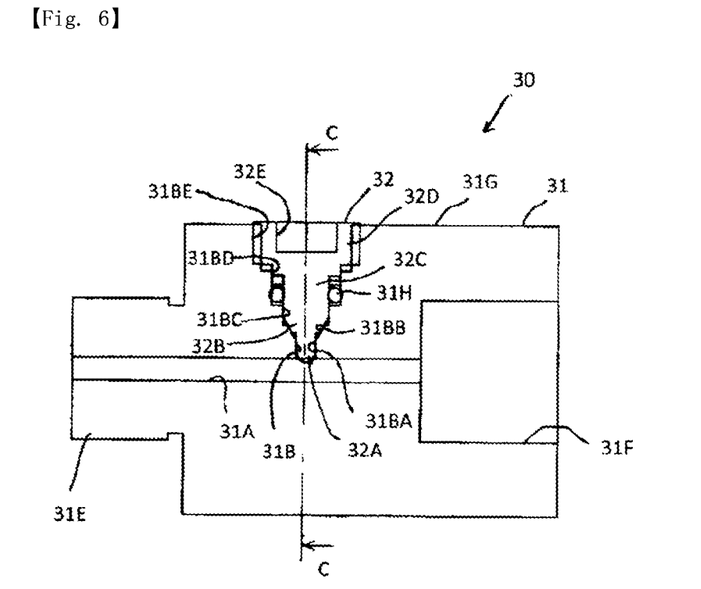
FIG. 6 is a cross sectional view showing a depressurizer in the embodiment.

In FIG. 6, the depressurizer 30 has a metal depressurizer main body portion (hereinafter referred to as "main body portion") 31 with a nearly rectangular parallelepiped shape and a metal depressurizing plug 32, and the depressurizing plug 32 is configured to engage with (screw to) a depressurizing communication hole 31B of the main body portion 31. On the left side of the main body portion 31 is formed a projecting portion 31E, and the projecting portion 31E is connected to the plug 10 side of the safety joint 100. On the right side of the main body portion 31 is formed a concaved portion 31F, and to the concaved portion 31F is connected the vehicle side filling hose (FIG. 12). However, it is possible that the projecting portion 31E is connected to the vehicle side filling hose, and the concaved portion 31F is connected to the plug 10 side of the safety joint 100. On a central portion in a vertical direction of the main body portion 31 in FIG. 6 is formed a hydrogen gas passage 31A, and the hydrogen gas passage 31A communicates through the projecting portion 31E with the in-plug passage 1A on the plug 10 side and communicates through the concaved portion 31F with the vehicle side filling hose.

Figure 7:
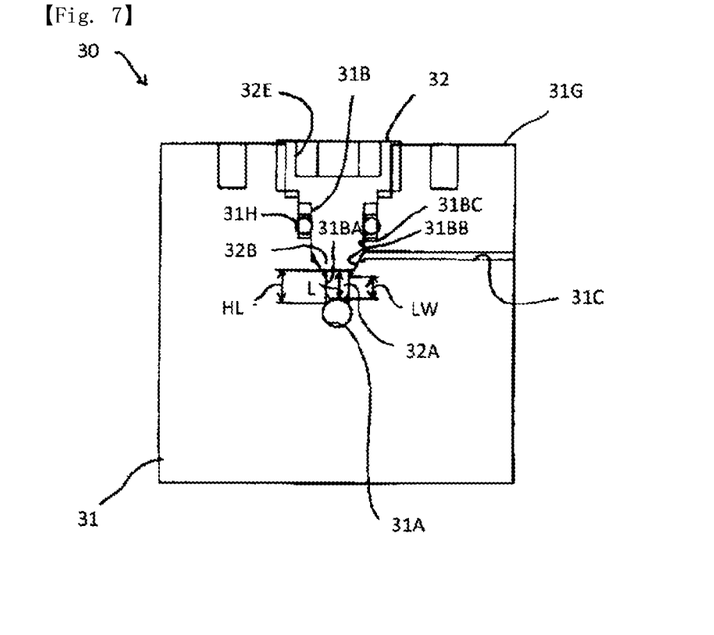
FIG. 7 is a cross sectional view taken along the C-C line in FIG. 6.
Figure 8:
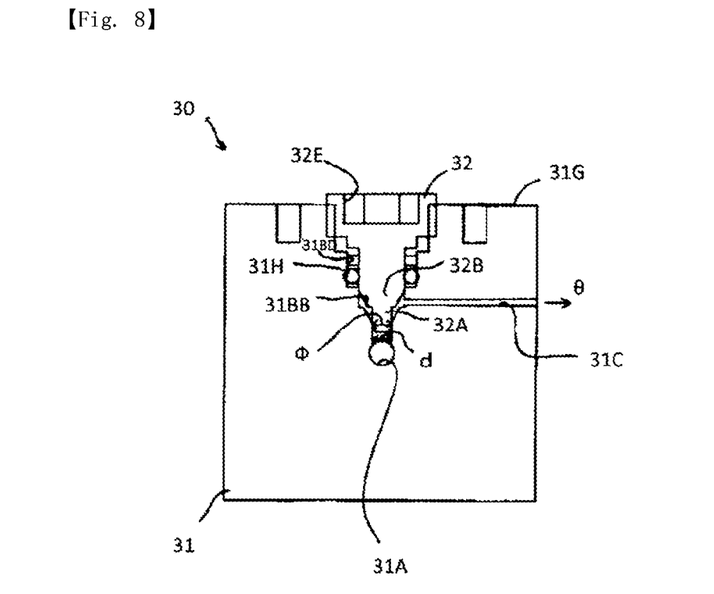
FIG. 8 is a cross sectional view showing a condition that a risen depressurizing plug allows hydrogen gas to outflow from a hydrogen gas passage to a relief circuit.

In FIG. 6, the depressurizing communication hole 31B communicating from an upper surface 31G with the hydrogen gas passage 31A extends in a vertical direction, and with the depressurizing communication hole 31B communicates a relief circuit 31C (refer to FIGS. 7 and 8: not shown in FIG. 6). A cross sectional area of the relief circuit 31C is set small to be enough to add a sufficient pressure loss to a flowing hydrogen gas. Into the depressurizing communication hole 31B is fitted the depressurizing plug 32, and as shown in FIG. 7, engagement of the depressurizing plug 32 and the depressurizing communication hole 31B shuts the relief circuit 31C from the hydrogen gas passage 31A.

The depressurizing communication hole 31B has a small diameter portion 31BA communicating with the hydrogen gas passage 31A, a tapered portion 31BB, the first middle diameter portion 31BC, the second middle diameter portion 31BD, and a female screw portion 31BE communicating with the upper surface 31G. The depressurizing plug 32 has a pin end portion 32A with a minimum diameter in a lower end portion, a pin tapered portion 32B, a pin middle diameter portion 32C, a male screw portion 32D forming a male screw on an outer periphery. When the depressurizing plug 32 is fitted into the depressurizing communication hole 31B, the pin end portion 32A of the depressurizing plug 32 is inserted into the small diameter portion 31BA of the depressurizing communication hole 31B.

Figure 10:
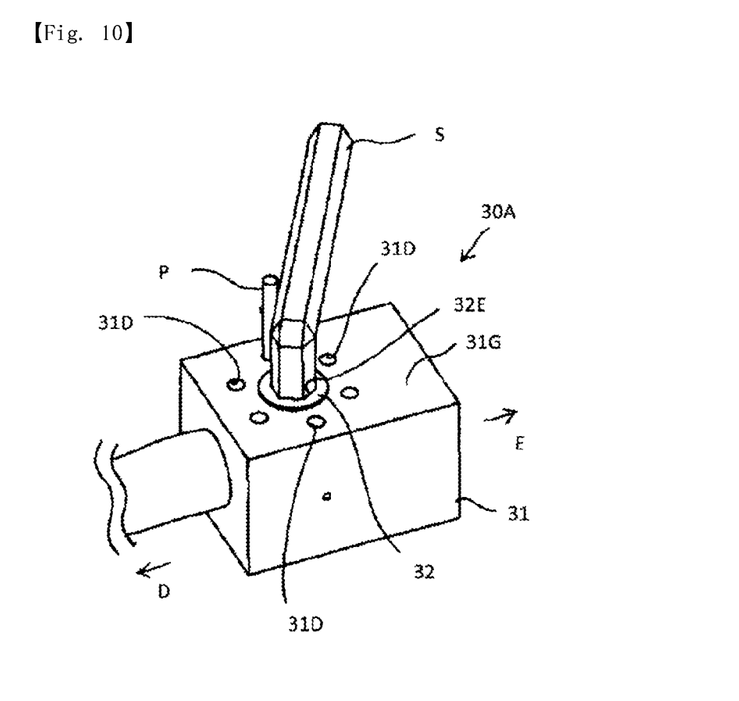
FIG. 10 is a perspective view showing the depressurizer shown in FIG. 9.

As shown in FIG. 6, the pin tapered portion 32B of the depressurizing plug 32 and the tapered portion 31BB of the depressurizing communication hole 31B are complementary shapes with each other, and the pin tapered portion 32B contacts the tapered portion 31BB. Here, the depressurizing plug 32 and the main body portion 31 are made of metal, so that a portion where the pin tapered portion 32B and the tapered portion 31BB contact with each other configures a so-called "metal seal". Between the pin middle diameter portion 32C of the depressurizing plug 32 and the second middle diameter portion 31BD of the pressurizing communication hole 31B is arranged an O-ring 31H, and the O-ring 31H prevents high pressure hydrogen gas from injecting upward from a gap between the depressurizing plug 32 and the depressurizing communication hole 31B when the depressurizing plug 32 sufficiently moves relative to (rises against: refer to FIG. 6) the depressurizing communication hole 31B (in a condition that engagement between the depressurizing plug 32 and the main body portion 31 is released: refer to FIG. 8). To the female screw portion 31BE of the depressurizing communication hole 31B screws a male screw formed on the outer periphery of the male screw portion 32D of the depressurizing plug 32. On an upper surface of the depressurizing plug 32 is formed a plug hexagonal hole 32E, and a hexagonal rod spanner S is inserted into the plug hexagonal hole 32E to be rotated as shown in FIG. 10 when the depressurizing plug 32 is attached to/detached from the depressurizing communication hole 31B.

As shown in FIGS. 7 and 8, in an area near a boundary between the tapered portion 31BB and the first middle diameter portion 31BC, the depressurizing communication hole 31B communicates with the relief circuit 31C. As shown in FIGS. 6 and 7, in a condition that the depressurizing plug 32 is tightened to the depressurizing communication hole 31B (in a condition that hydrogen is filled without separation of the safety joint 100), the pin tapered portion 32B and the tapered portion 31BB of the depressurizing communication hole 31B contact with each other to configure the metal seal, so that high pressure hydrogen gas flowing in the hydrogen gas passage 31A is completely shut by the metal seal and does not flow into the relief circuit 31C. On the other hand, in case that the safety joint 100 is separated, when high pressure hydrogen gas existing in an area on the vehicle side from the plug 10 (in-plug passage 1A shown in FIGS. 2 to 5) is discharged as depressureizing, the depressurizing plug 32 is rotated in a depressurizing direction by the hexagonal rod spanner S, the engagement between the female screw portion 31BE of the depressurizing communication hole 31B and the male screw portion 32D of the depressurizing plug 32 is released, the pin tapered portion 32B and the tapered portion 31BB of the depressurizing communication hole 31B are separated from each other, and the metal seal is released.

A condition that the metal seal is released is shown in FIG. 8. A diameter size φ of the pin end portion 32A is set slightly smaller than the inner diameter d of the small diameter portion 31BA of the depressurizing communication hole 31B (φ<d), and between an outer periphery of the pin end portion 32A and an inner periphery of the small diameter portion 31BA of the depressurizing communication hole 31B is formed an annular gap whose cross sectional area is $(\pi/4)(d^2-\varphi^2)$. When the depressurization is performed, high pressure hydrogen gas filled in the hydrogen gas passage 31A inflows through the annular gap into the relief circuit 31C and passes through the relief circuit 31C to outflow from the depressurizer 30 as shown by the arrow θ. Here, a hydrogen gas outlet of the relief circuit 31C is formed at a position apart from the plug hexagonal hole 32E.

In FIGS. 6 to 8, as shown in FIG. 7 for example, in a condition the depressurizing plug 32 is tightened to the depressurizing communication hole 31B, a length L of the pin end portion 32A (vertical length in FIG. 7) and a length HL of the small diameter portion 31BA of the depressurizing communication hole 31B are relatively long, and a length LW of the pin end portion 32A inserted into the small diameter portion 31BA of the depressurizing communication hole 31B is relatively long also. Therefore, even if the hexagonal rod spanner S is excessively rotated in the plug hexagonal hole 32E, the pin end portion 32A will not be completely separated from the small diameter portion 31BA of the depressurizing communication hole 31B, a condition that the hydrogen gas passes through the annular gap between the small diameter portion 31BA and the pin end portion 32A (cross sectional area is $(\pi/4)(d^2-\varphi^2)$) is maintained, and pressure loss can be applied to the high pressure hydrogen gas.

Figure 9:
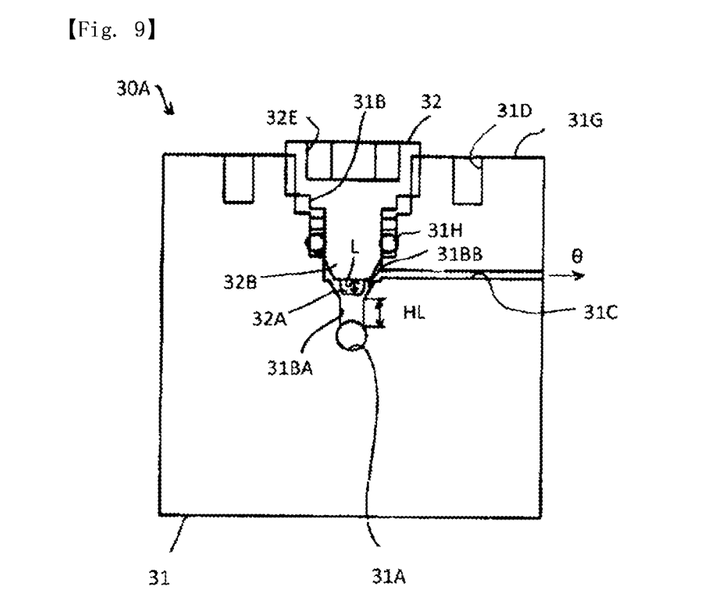
FIG. 9 is a cross sectional view showing a condition that a risen depressurizing plug allows hydrogen gas to outflow to a relief circuit in another depressurizer different from that shown in FIGS. 6 to 8.

In FIGS. 9 and 10 is shown a depressurizer 30A different from the depressurizer 30 shown in FIGS. 6 to 8. The length L (vertical length in FIG. 9) of the pin end portion 32A of the plug 32 is clearly shorter than that of the depressurizer 30 shown in FIG. 7, and the length LW (refer to the depressurizer 30 shown in FIG. 7) of the pin end portion 32A inserted into the small diameter portion 31BA is shorter than that also. Therefore, when in depressurizing shown in FIG. 9, into the plug hexagonal hole 32E is inserted the hexagonal rod spanner S, and the hexagonal rod spanner S is excessively rotated, there is a possibility that from the small diameter portion 31BA of the depressurizing communication hole 31B is completely separated the pin end portion 32A of the plug 32; cross sectional area of a gap between the depressurizing communication hole 31B and the plug 32 becomes large; the gap does not work as an orifice; and velocity of the hydrogen gas outflowing from the relief circuit 31C increases.

Therefore, in the depressurizer 30A, as shown in FIGS. 9 and 10, on the upper surface 31G of the main body portion 31 is formed a locking pin insertion hole 31D, and into the locking pin insertion hole 31D is insertable a locking pin P for suppressing rotation of the hexagonal rod spanner S. By the locking pin P, excessive rotation of the hexagonal rod spanner S is suppressed, and a condition that the gap between the pin end portion 32A of the plug 32 and the small diameter portion 31BA of the depressurizing communication hole 31B exists is maintained, which functions to generate a pressure loss in hydrogen gas. In addition, in FIG. 10, the arrow D indicates the filling hose on the vehicle side, and the arrow E indicates the plug 10 side in the safety joint 100. In addition, the depressurizer 30 shown in FIGS. 6 to 8 also, the locking pin P and the locking pin insertion hole 31D can be mounted to prevent the excessive rotation of the hexagonal rod spanner S. In FIGS. 9 and 10, to the same members as those shown in FIGS. 6 to 8 are attached the same numerals as those, and overlapped explanation is omitted. Then, other construction and action effect of the depressurizer 30A shown in FIGS. 9 and 10 are the same as those of the depressurizer 30.

Figure 11:
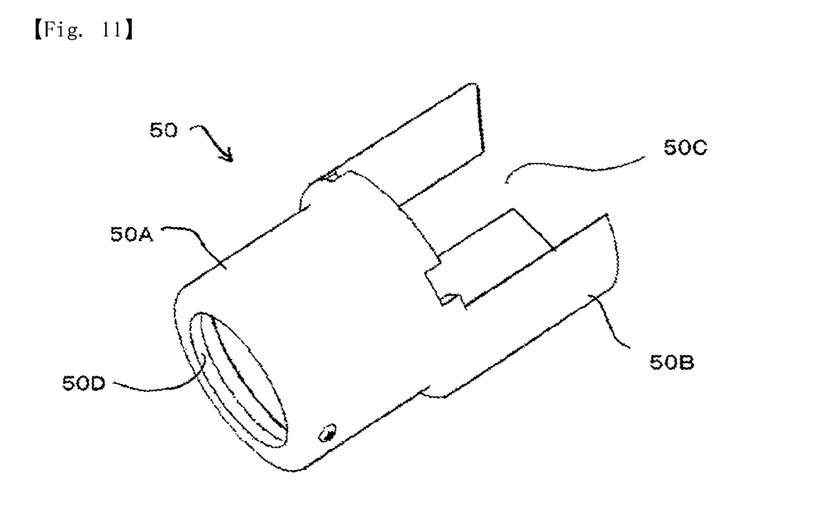
FIG. 11 is a perspective view showing a cover according to the embodiment.

In FIG. 11, the cover 50 is integrally constituted by metal members, and has a main body portion 50A with a cylindrical shape and a socket inserted portion 50B. As shown in FIG. 1, the main body portion 50A of the cover 50 covers the plug main body 1 and the plug accommodating housing 26 (refer to FIG. 2 etc.) of the socket 20, and the socket inserted portion 50B covers the plug side rod accommodating case 3 and the plug side rod 2 (FIGS. 2 to 4). In a space portion 50C of the socket inserted portion 50B is accommodated a connected portion of the plug 10 and the socket 20, the connected portion positioning lower side of the socket 20.

Although not clearly shown in figures, the cover 50 is attached to the plug 10 by a conventionally known method. The cover 50 is mounted to protect the plug side rod 2 when the plug 10 and the socket 20 are separated from each other, so that the cover 50 surrounds the socket 20 side such that the separation between the socket 20 and the plug 10 are not prevented. An end portion opposite to the socket inserted portion 50B (left side in FIG. 11) in the main body portion 50A of the cover 50 has an opening 50D. As described above, the plug main body 1 is connected through the depressurizer 30 (or 30A) to the vehicle side (refer to FIG. 1).

With the safety joint 100 according to the embodiment shown in the figures, the cover 50 is mounted to completely surround the plug side rod 2 (valve rod) mounted on the plug 10 and/or the plug side rod accommodating case 3 including the longitudinal directions thereof, so that it is prevented that the plug side rod 2 is broken because impacts are not directly acted on the plug side rod 2 even if the plug 10 falls or collides with the hydrogen filling apparatus or the vehicle in case that the plug 10 and the socket 20 are separated from each other in an emergency when the vehicle runs while hydrogen is filled. In addition, the cover 50 is securely attached to the plug 10 side, and covers the socket 20 side such that separation of the socket is not prevented, so that it maintains that the cover 50 covers the plug side rod 2, and the cover 50 separates from the socket 20 side when the plug 10 and the socket 20 are separated from each other. Therefore, the plug side rod 2 can be surely protected.

In addition, in the embodiment shown in the figures, the safety joint 100 is arranged near the hydrogen filling apparatus (weighing machine) and near a base portion of the filling hose communicating with the filling nozzle, so that the safety joint 100 is supported by the hydrogen filling apparatus, and weight of the hose does not increase. Therefore, there is no possibility that it becomes difficult for filling workers to handle the hose.

In the embodiment shown in the figures, central axes of the in-plug passage 1A and the in-socket passage 1A do not form a straight line, and are orthogonal with each other, so that central axes of the plug side rod 2 and the socket side rod 22 do not form a straight line also, the plug side rod 2 and the socket side rod 22 are not pressed with each other under a condition that end portions (pin connecting end portions) contact with each other. Therefore, even if high pressure hydrogen gas is fed, forces that push end portions of the socket side rod 22 and the plug side rod 2 with each other do not increase, and the socket 20 and the plug 10 are not separated from each other. Then, the end portions of the socket side rod 22 and the plug side rod 2 do not press with each other, and directions that the socket 20 and the plug 10 are separated from each other are different from each other, so that the separated socket 20 and plug 10 are not blown off. Further, the safety joint 100 can be made small in size and light in weight, and operability when hydrogen gas is filled improves.

In addition, in the embodiment shown in the figures, the plug 10 and the socket 20 are connected with each other by the connecting balls (connecting members) 40 radially mounted at plurality of portions, so that a condition that the plug 10 and the socket 20 are connected with each other is surely maintained. Then, the connecting balls 40 are configured to release the connection when an external force in a separating direction more or equal to a predetermined value acts on the connecting balls 40, so that the external force acting on the filling hose (tensile force acting on the filling hose when the vehicle runs while hydrogen is filled) separates the plug 10 and the socket 20 from each other regardless of pressures in the passages in the plug 10 and the socket 20.

In the embodiment shown in the figures, when the plug 10 and the socket 20 are separated from each other, the socket side shut off valve 24 and the plug side shut off valve 5 are surely closed. Therefore, when the plug 10 and the socket 20 are separated from each other, it is prevented that hydrogen gas outflows.

In addition, in the embodiment shown in the figures, since the depressurizers 30, 30A are mounted on the plug 10, when the plug 10 and the socket 20 are separated from each other for example, high pressure hydrogen gas in the filling hose can be discharged at small flow rate and low pressure outside the filling hose (outside the depressurizers 30, 30A). Therefore, it is prevented that the high pressure hydrogen gas rapidly injects, and the filling hose unexpectedly moves around due to the rapid injection of the hydrogen gas.

In the depressurizers 30, 30A according to the embodiment shown in the figures, a portion where the pin tapered portion 32B of the depressurizing plug 32 and the tapered portion 31BB of the depressurizing communication hole 31B contact with each other configures metal seal to completely shut high pressure hydrogen gas flowing in the hydrogen gas passage 31A. Then, at the depressurizing, when the contact of the tapered portions 32B, 31BB is released, the gap (cross sectional area $(\pi/4)(d^2-\varphi^2)$, annular gap) formed between an outer periphery of the hydrogen passage side end portion (32A: pin end portion, diameter size "$\varphi$") of the depressurizing plug 32 and inner periphery of the hydrogen passage side end portion (31BA: small diameter portion, inner diameter "d") of the depressurizing communication hole 31B works as an orifice, and imparts pressure loss to high pressure hydrogen gas flowing through the orifice, so that injecting velocity of hydrogen gas outflowing from the depressurizers 30, 30A becomes slow.

In addition, the relief circuit 31C for outflowing hydrogen gas is formed, and the hydrogen gas outlet of the relief circuit 31C is formed at a position apart from an area above the depressurizing plug 32. Then, even if sparks generate by contacts between metals when the hexagonal rod spanner S is inserted into the plug hexagonal hole 32E mounted on the upper portion of the plug 32 to be rotated, a possibility that the hydrogen gas catches fire due to the sparks becomes extremely low, and safety thereof improves.

Since the embodiments shown in the drawings are merely examples, and the embodiments do not limit the technical scope of the present invention.

DESCRIPTION OF THE REFERENCE NUMERALS 1 plug main body
1A in-plug passage
2 plug side rod
10 plug
20 socket
21 socket main body
21A in-socket passage
30, 30A depressurizers
31 main body portion
31A hydrogen gas passage
31B depressurizing communication hole
31BA small diameter portion
31BB tapered portion
31C relief circuit
31D locking pin insertion hole
32 depressurizing plug
32A pin end portion
32B pin tapered portion
50 cover
100 safety joint
HL length of depressurizing communication hole
L length of small diameter portion
P locking pin
S hexagonal rod spanner

What is claimed is:
1. A safety joint comprising:
a plug with a cylindrical shape in which a passage is formed,
a socket in which a passage continuing to the passage in the plug is formed,
a shut off valve mounted on the passage in the socket, the shut off valve opening when the plug being inserted into the socket and closing when the plug being disconnected therefrom, wherein central axes of the passages of the plug and the socket do not form a straight line, a valve rod mounted on one of the plug and the socket, and a cover for protecting the valve rod, the cover and the valve rod being configured such that the valve rod is exposed when the plug separates from the socket.

2. The safety joint as claimed in claim 1, wherein the cover surrounds a portion of one of the plug and the socket which the valve rod is not mounted and has a shape attachable to the plug and the socket.

3. The safety joint as claimed in claim 1, wherein one of the plug and the socket comprises a depressurizer including a main body portion made of metal, a depressurizing communication hole communicating with a hydrogen gas passage in the main body portion, a depressurizing plug made of metal, the depressurizing plug insertable into the depressurizing communication hole, and tapered portions formed on the depressurizing communication hole and the depressurizing plug respectively, the tapered portions having complemental shapes with each other.

4. The safety joint as claimed in claim 3, further comprising a relief circuit for outflowing a filled fluid and communicating with the depressurizing communication hole, an outlet of the relief circuit being formed at a position separated from an area above the depressurizing plug.

5. The safety joint as claimed in claim 2, wherein one of the plug and the socket comprises a depressurizer including a main body portion made of metal, a depressurizing communication hole communicating with a hydrogen gas passage in the main body portion, a depressurizing plug made of metal, the depressurizing plug insertable into the depressurizing communication hole, and tapered portions formed on the depressurizing communication hole and the depressurizing plug respectively, the tapered portions having complemental shapes with each other.

6. The safety joint as claimed in claim 5, further comprising a relief circuit for outflowing a filled fluid and communicating with the depressurizing communication hole, an outlet of the relief circuit being formed at a position separated from an area above the depressurizing plug.

7. The safety joint as claimed in claim 1, wherein the valve rod extends along a rod axis, the cover being configured so as not to traverse the rod axis when the plug separates from the socket.

8. A safety joint comprising:

a plug in which a passage is formed;

a socket in which a passage continuing to the passage in the plug is formed;

a shut off valve mounted on the passage in the socket, the shut off valve opening when the plug being inserted into the socket and closing when the plug being disconnected therefrom, wherein central axes of the passages of the plug and the socket do not form a straight line;

a valve rod mounted on one of the plug and the socket, the valve rod extending along a rod axis; and a cover for protecting the valve rod, the cover being configured so as not to traverse the rod axis when the plug separates from the socket.

\* \* \* \* \*